Oct. 2, 1928.
C. C. FARMER
DUPLEX PRESSURE RETAINER
Filed March 10, 1927
1,685,843
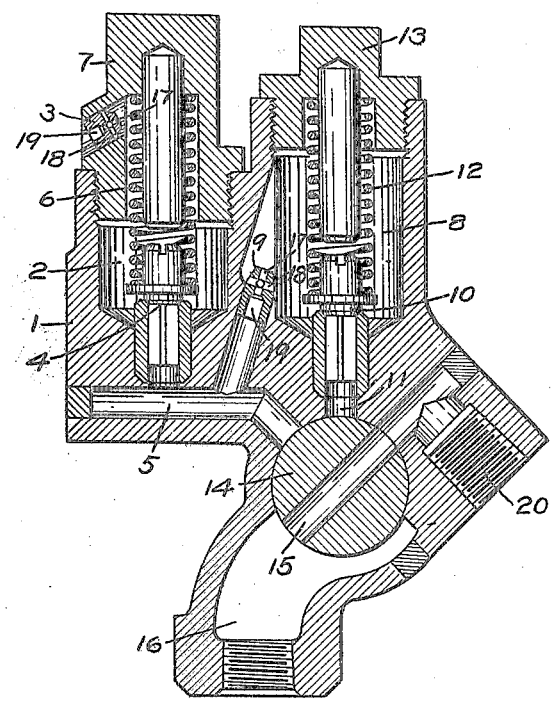
INVENTOR
CLYDE C FARMER
BY *Wm. M. Cady*
ATTORNEY Patented Oct. 2, 1928.

1,685,843

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DUPLEX PRESSURE RETAINER.

Application filed March 10, 1927. Serial No. 174,192.

This invention relates to fluid pressure brakes and more particularly to a brake cylinder pressure retaining valve device.

The usual duplex type of retaining valve device is provided with two valves acted upon by springs, and is adapted to retain different degrees of pressure in the brake cylinder. The valve device is provided with a plug valve adapted to be operated by a handle and has three positions, in one of which, one of the retaining valves is connected to the brake cylinder, so as to retain one degree of pressure in the brake cylinder and in another position, both retaining valves are connected to the brake cylinder, so as to retain a higher degree of pressure in the brake cylinder, and having a third handle position in which the fluid is released from the brake cylinder directly to the atmosphere. The position of the retaining valve device employed, depends upon the track conditions, such as the severity of a grade, which a car must descend.

The higher retained brake cylinder pressure provides for the more severe grades and the lower retained brake cylinder pressure for less severe grades, but in passing from a severe grade to a less severe grade, the retained brake cylinder pressure may be so high that the train will be stalled or brought to a stop, when not desired.

The principal object of my invention is to provide an improved retaining valve device, in which a high pressure may be retained in the brake cylinder on severe grades, as with the usual retaining valve device, while only a low pressure is retained in the brake cylinder, when desired on less severe grades.

In the accompanying drawing, the single figure is a sectional view of a retaining valve device, embodying my invention.

As shown in the drawing, the retaining valve device comprises a casing 1, having a valve chamber 2 connected to the atmosphere through a choke plug 3 and containing a valve 4 for controlling communication from a passage 5 to chamber 2, said valve being subject on one side to the pressure of a spring 6, which extends into a chamber of a cap nut 7 having screw threaded engagement in the casing 1.

The casing 1 also has a valve chamber 8 connected through choke plug 9 with passage 5, and containing a valve 10 adapted to control communication between passage 11 and chamber 8, said valve being subject, on one side to the pressure of a spring 12, one end of which extends into a chamber of a cap nut 13, having screw threaded engagement in the casing.

Also contained in the casing 1 is a plug valve 14 having a through port 15 and adapted to be operated by a handle (not shown). The port 15 is adapted to open into a chamber 16, which is connected through the usual retaining valve pipe to the exhaust passage of the triple valve device on the car, so that the fluid under pressure vented from the brake cylinder flows to chamber 16.

The choke plugs 3 and 9 are of an improved non-clogging type having conical ends pointing against the direction of flow of fluid under pressure and each having a central port 17 and four cross ports 18 entering the port 17. The port 17 connects with a port 19 of enlarged bore.

In operation, with the plug valve 14 in the normal position, as shown on the drawing, the port 15 connects chamber 16 to the atmospheric exhaust passage 20 and so provides for the direct release of fluid from the brake cylinder to the atmosphere.

In the low pressure position of the retaining valve device, the port 15 connects chamber 16 to passage 5, which permits fluid under pressure from the brake cylinder (not shown) to flow into passage 5. If the pressure of fluid exceed the pressure of spring 6, the valve 4 is lifted against the pressure of spring 6 and fluid is then vented from chamber 2 through the choke plug 3 to the atmosphere. When the brake cylinder pressure is reduced to a degree less than the pressure of spring 6, the spring closes the valve 4 and prevents any further reduction in brake cylinder pressure.

In the high pressure position of the retaining valve device, the port 15 connects chamber 16 to passage 11, which permits fluid under pressure from the brake cylinder to lift the valve 10 against the pressure of spring 12 and fluid then flows into valve chamber 8, thence through the choke plug 9 into passage 5. The fluid under pressure thus supplied to passage 5 then lifts the valve 4 and flows into valve chamber 2 and thence through choke plug 3 to the atmosphere. It will be noted, that in this position, the rate of blow down will be lower than in the low pressure position, since the flow of fluid under pressure from the brake cylinder must take place through the two choke plugs 9 and 3 in line with each other, and that the brake cylinder pressure retained in the brake cylinder will be equal to the combined pressures of the two springs 6 and 12. The choke plug 9 has no influence upon the rate of blow down in low pressure position, since it is by-passed in that position.

With the above described construction, the pressures of the springs 6 and 12 may be varied, but preferably are comparatively light, so that the ultimate retained brake cylinder pressures will be low, but at the same time the varying rates of blow down permits the holding of a high average brake cylinder pressure, sufficient to obtain the desired purposes of the usual high pressure retaining valve. The low ultimate brake cylinder pressure enables a train to be started more easily on a grade and prevents undesired stopping of the train on a grade reversal, as may occur with the usual high pressure retaining valve device.

The longer blow down times, in conjunction with the ultimate low brake cylinder pressures, provides ample time for recharging the braking system without definitely retaining a high brake cylinder pressure and thereby provides a greater flexibility in the brake control.

Having now described my invention, what I claim as new and desire to secure by Letters Patent is:—

1. A pressure retaining valve device comprising two retaining valves and means for directing the flow of fluid past one retaining valve, and through a restricted port to the other retaining valve.

2. A pressure retaining valve device comprising two retaining valves and means for directing the flow of fluid past one retaining valve, and through a restricted port to the other retaining valve and past the other retaining valve to the atmosphere.

3. A pressure retaining valve device comprising two retaining valves and means for directing the flow of fluid past one retaining valve, and through a restricted port to the other retaining valve, and past the other retaining valve through a restricted port to the atmosphere.

4. A pressure retaining valve device comprising two retaining valves and means for at one time directing the flow of fluid past one retaining valve and thence through a restricted port to the atmosphere and at another time past one retaining valve and through a restricted port to the other retaining valve and thence past the other retaining valve and through a restricted port to the atmosphere.

In testimony whereof I have hereunto set my hand.

CLYDE C. FARMER.